United States Patent
Lohner et al.

(10) Patent No.: US 9,876,760 B2
(45) Date of Patent: *Jan. 23, 2018

(54) PEER-TO-PEER CONNECTION ESTABLISHMENT USING TURN

(71) Applicant: Akamai Technologies, Inc., Cambridge, MA (US)

(72) Inventors: Martin Lohner, Cambridge, MA (US); Brandon Williams, Cambridge, MA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/390,611

(22) Filed: Dec. 26, 2016

(65) Prior Publication Data

US 2017/0111314 A1  Apr. 20, 2017

Related U.S. Application Data

(63) Continuation of application No. 14/852,655, filed on Sep. 14, 2015, now Pat. No. 9,531,667, which is a continuation of application No. 14/082,635, filed on Nov. 18, 2013, now Pat. No. 9,137,196, which is a continuation of application No. 13/339,479, filed on Dec. 29, 2011, now Pat. No. 8,588,233.

(60) Provisional application No. 61/428,875, filed on Dec. 31, 2010.

(51) Int. Cl.
*H04L 29/12* (2006.01)
*H04L 29/08* (2006.01)

(52) U.S. Cl.
CPC ...... *H04L 61/2589* (2013.01); *H04L 61/1511* (2013.01); *H04L 61/2007* (2013.01); *H04L 61/6004* (2013.01); *H04L 67/104* (2013.01); *H04L 67/141* (2013.01)

(58) Field of Classification Search
CPC combination set(s) only.
See application file for complete search history.

(56) References Cited

U.S. PATENT DOCUMENTS

| 8,374,188 | B2 * | 2/2013 | Yahyaoui | H04L 29/12528 370/351 |
| 2004/0139228 | A1 * | 7/2004 | Takeda | H04L 29/12066 709/245 |

(Continued)

OTHER PUBLICATIONS

J. Rosenberg, R. Mahy, P. Matthews, Traversal Using Relays around NAT (TURN): Relay Extensions to session Traversal Utilities for NAT (STUN), Jul. 3, 2009, Internet Engineering Task Force (IETF), draft-ietf-behave-turn-16, pp. 1-81.*

*Primary Examiner* — Kouroush Mohebbi
(74) *Attorney, Agent, or Firm* — David H. Judson

(57) ABSTRACT

A relay service enables two peers attempting to communicate with one another to each connect to a publicly-accessible relay server, which servers are associated with an overlay network and are selected by a directory service. After end-to-end connectivity is established, preferably the hosts communicate with each other by relaying data packets via the overlay network relay servers. Communications (both connection control messages and data being relayed) between a host and a relay server occurs at an application layer using a modified version of the TURN protocol.

10 Claims, 5 Drawing Sheets

(56) References Cited

U.S. PATENT DOCUMENTS

| | | | |
|---|---|---|---|
| 2009/0215438 A1* | 8/2009 | Mittal | H04M 3/42195 455/418 |
| 2010/0027418 A1* | 2/2010 | Rodrig | H04L 41/147 370/235 |
| 2010/0100630 A1* | 4/2010 | Jiang | H04L 29/1249 709/228 |
| 2010/0257276 A1* | 10/2010 | Savolainen | H04L 29/12386 709/230 |
| 2011/0055392 A1* | 3/2011 | Shen | H04L 29/12528 709/225 |
| 2012/0099599 A1* | 4/2012 | Keranen | H04L 29/12537 370/392 |

* cited by examiner

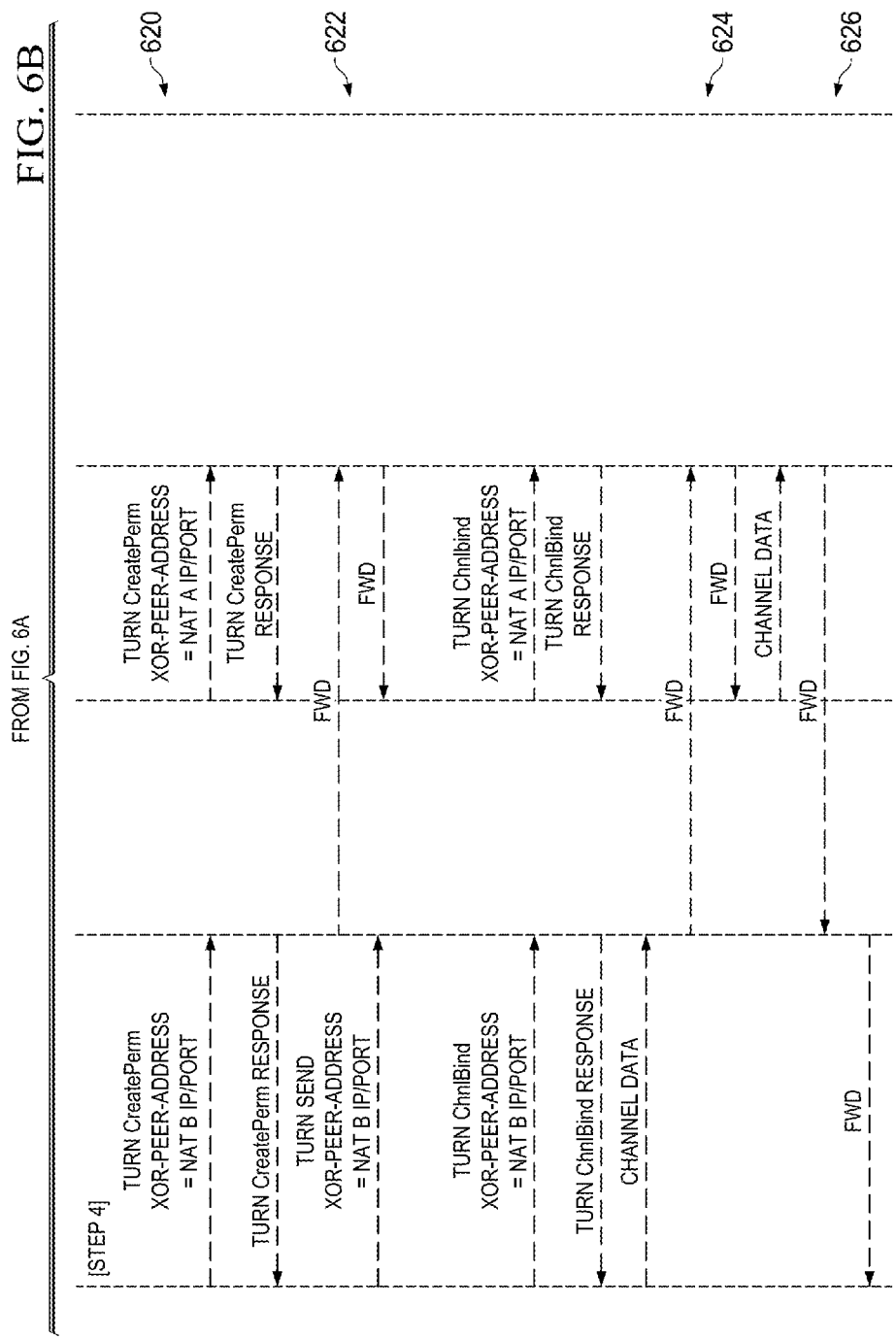

PEER-TO-PEER CONNECTION ESTABLISHMENT USING TURN

BACKGROUND OF THE INVENTION

Technical Field

This application relates generally to relaying communications between end user devices.

Brief Description of the Related Art

The establishment of a peer-to-peer connection between mobile devices to enable the devices to communicate with one another (e.g., over a video calling application) is complicated by the use of Network Address Traversal (NAT) devices. If one or both peers are located behind NAT devices that provide connectivity using address-mapping or address-and-port-mapping techniques, then it might not be possible for the peers to establish direct end-to-end connectivity. Protocols exist that allow peers to overcome the problem of NAT traversal through the use of public packet relays, the most common of which is "Traversal Using Relays around NAT" (TURN). Use of a public TURN relay service has some drawbacks for performance, most notably the penalty that may be associated with the location of the relay server.

It would be desirable to provide a NAT traversal relay service that does not have the same performance drawbacks associated with a more centralized TURN relay service.

This disclosure addresses this need in the art.

BRIEF SUMMARY

An accelerated relay service enables host A and host B, two peers attempting to communicate with one another, to each connect to a publicly-accessible relay server, which servers are associated with an overlay network and are selected by a directory service that is also responsible for exchanging other information (necessary for connection establishment) between the hosts. After end-to-end connectivity is established, preferably the hosts communicate with each other by relaying data packets via the overlay network relay servers. Preferably, communication (both connection control messages and data being relayed) between a host and a relay server occurs at an application layer using a modified version of the TURN protocol. Typically, TURN protocol messages are transported between the host and its associated relay server within UDP datagrams, but under some circumstances, such messages are also transported as a TCP stream or encapsulated within pseudo-SSL records.

The foregoing has outlined some of the more pertinent features of the disclosed subject matter. These features should be construed to be merely illustrative. Many other beneficial results can be attained by applying the disclosed invention in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIGS. 6A-6B represent a UML time sequence diagram illustrating the basic connection setup for the relay service shown in FIG. 5.

DETAILED DESCRIPTION

Figure 1:
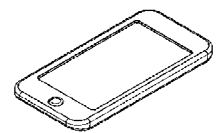
FIG. 1 is an exemplary mobile device "peer"
Figure 2:
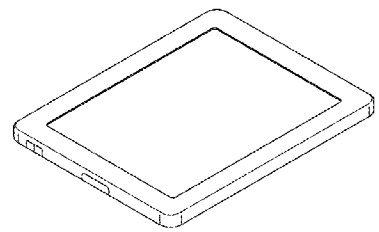
FIG. 2 is an exemplary tablet device "peer"

The technical solution herein provides a relay service to enable end user devices to communicate with one another in a peer-to-peer manner more efficiently. Representative peer devices are shown in FIG. 1 and FIG. 2. These are merely representative. Typically, the mobile device is a smartphone or tablet, such as the iPhone® or iPad®, an Android™-based mobile device, or the like. Each such device typically comprises a CPU (central processing unit), such as any Intel- or AMD-based chip, computer memory, such as RAM, and a drive. The device software includes an operating system (e.g., Apple iOS, Google® Android, or the like), and generic support applications and utilities. The device may also include a graphics processing unit (GPU). A touch-sensing device or interface is configured to receive input from a user's touch to enable gesture-based control over the device or supported applications. In one example embodiment, the devices seeking to communicate with one another each execute a video calling application (such as Apple® FaceTime™) to enable the end users to carry out a video call. Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. Of course, a particular peer may be any computing machine such as a desktop, laptop, or the like. Generalizing, a peer is any system, machine, device, or combinations thereof.

Figure 3:
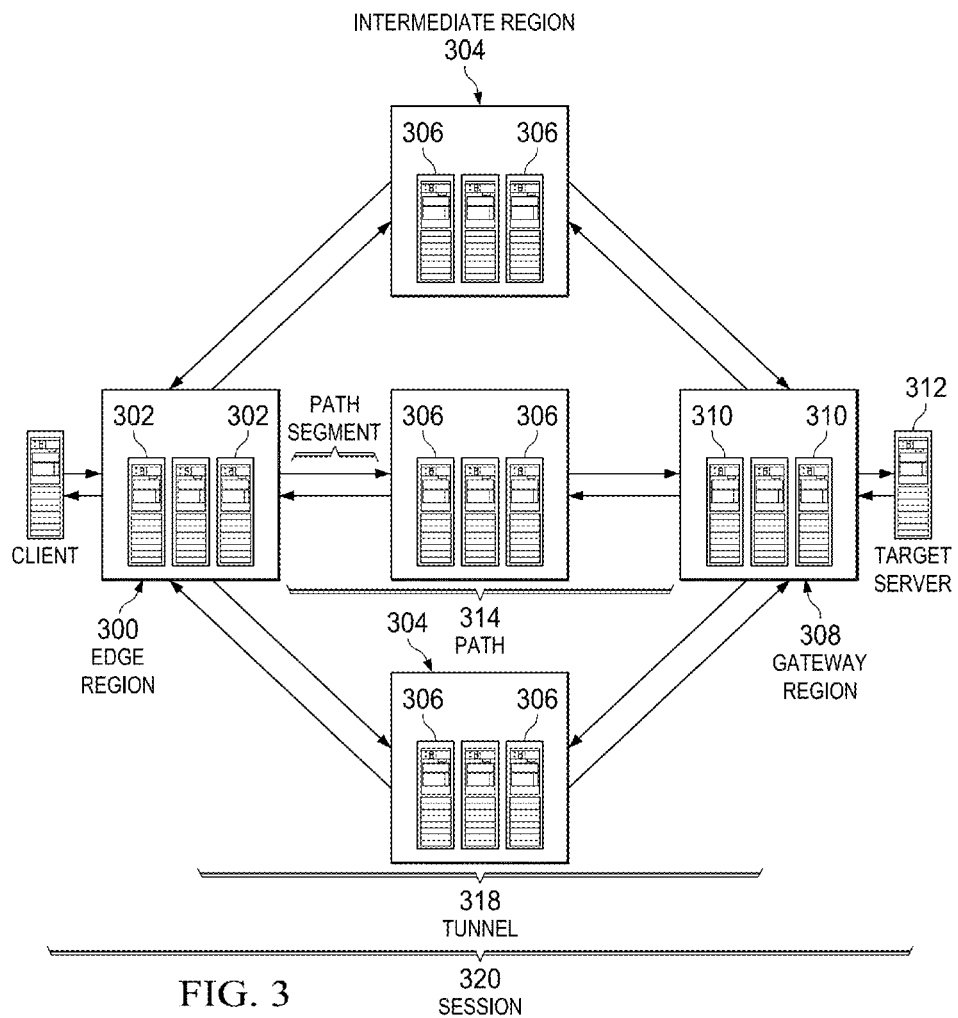
FIG. 3 is a known overlay network service.

FIG. 3 illustrates a known "overlay" network solution whereby an "overlay" is positioned on top of the publicly-routable Internet. The overlay network may leverage existing content delivery network (CDN) infrastructure, such as infrastructure provided by commercial services providers such as Akamai Technologies, Inc. of Cambridge, Mass. An overlay network of this type provides significant performance enhancements for any application that uses Internet Protocol (IP) as a transport protocol by routing around down links or finding a path with a smallest latency. As is well known, the Internet Protocol (IP) works by exchanging groups of information called packets, which are short sequences of bytes comprising a header and a body. The header describes the packet's destination, which Internet routers use to pass the packet along until it arrives at its final destination. The body contains the application data. Typically, IP packets travel over Transmission Control Protocol (TCP), which provides reliable in-order delivery of a stream of bytes. TCP rearranges out-of-order packets, minimizes network congestion, and re-transmits discarded packets.

As will be described, the relay service of this disclosure (sometimes referred to as an "accelerated relay") may be implemented within the context of an overlay IP (OIP) routing mechanism that comprises a portion of an overlay (or "content delivery") network ("CDN"). This implementation, however, is not intended to be limiting, as the solution may be supported in any wireless or wire-line network, whether public or private, virtual or otherwise. As is well-known, an overlay network typically comprises a set of machines distributed around the Internet. Many of the machines are servers located near the edge of the Internet, i.e., at or adjacent end user access networks. Third party web sites and application providers offload delivery of content and applications to the network, which operates as a managed service. The overlay network includes distributed infrastructure for data collection, monitoring, logging, alerts, billing, management and other operational and administrative functions. A typical CDN machine comprises commodity hardware (e.g., an Intel® Pentium® processor) running an operating system kernel (such as Linux™ or variant) that supports one or more applications. To facilitate content delivery services, for example, given machines typically run a set of applications, such as an HTTP Web proxy, a name server, a local monitoring process, and one or more data collection processes. The Web proxy includes or has associated therewith an edge server manager process to facilitate one or more functions associated with the content delivery network.

A known OIP routing mechanism comprises a representative set of components, as illustrated in FIG. 3:

edge server 302—typically, a CDN edge server running an OIP edge server software process (oidp) as described below. As will be described, this software is responsible for receiving, encapsulating and forwarding IP packets.

edge region 300—typically, a CDN edge region configured for the overlay mechanism.

intermediate server 306—typically, a server that receives encapsulated packets from an edge region 300 or other intermediate servers and forwards them on to other intermediate servers or to a gateway region.

intermediate region 304—a region of intermediate servers.

gateway server 310—typically, an edge server that has been configured to receive encapsulated packets from the overlay, and that applies source network address translation (NAT) to the original packets and forwards them onto the target server.

gateway region 308—typically, a type of edge region comprising gateway servers and that is usually deployed on customer premises.

Target server 312—a machine whose traffic is to be tunneled through the overlay.

target address—the IP address of the target server; this address is sometimes referred to as a direct address when being compared to a CDN virtual IP address.

slot—a single "instance" of the overlay; preferably, a slot is a numbered index that corresponds to a single target address.

virtual IP address—typically, a CDN address that corresponds to a slot; preferably, there is one virtual IP address per edge region per slot. It is sometimes referred to as a VIP.

path 314—an ordered set of CDN regions between an edge region and a gateway region.

path Segment 316—a single hop of a path.

tunnel 318—a set of one or more paths from an edge server to a gateway server.

session 320—A single end-to-end connection from the client 322 to the target server; preferably, the session is defined by a five tuple (IP payload protocol, source address, destination address, source port, destination port). The source is the client and the destination is the target.

Figure 4:
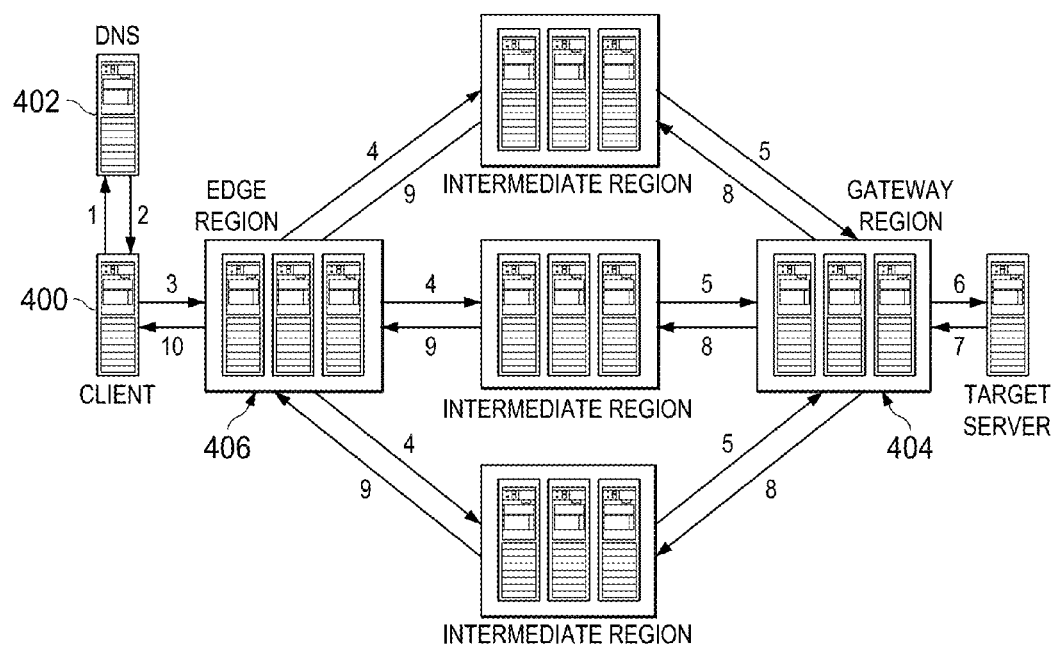
FIG. 4 illustrates how the overlay network service of FIG. 3 is used to provide application acceleration over the IP routing layer.

In one known use scenario of the overlay network, one or more clients desire to send packets to a single IP address. This is illustrated in FIG. 4 and is now described. At step 1, the client 400 makes a DNS request to resolve a hostname, typically a hostname associated with a web-accessible application. This hostname is aliased (e.g., by a CNAME) to a domain that is being managed by an authoritative DNS 402; typically, the authoritative DNS is managed by the CDN service provider. Preferably, this hostname corresponds to a single gateway region (and target address) 404. This is also referred to as a slot, as described above. At step 2, the DNS query returns a single IP address for the hostname. This address identifies a best performing available edge region 406 and, preferably, that region is dedicated to the hostname. The address is referred to as a virtual IP address, as described above. At step 3, the client 400 begins to send IP packets to the virtual IP address. These packets are received by a server in the edge region 406. The edge region 406 knows the gateway region 404 to which to send the packets based on the destination address in the IP packet header. The packet is then encapsulated. At step 4, and based on routes preferably provided by a CDN mapping system, the edge server in the edge region 406 sends out multiple copies of the encapsulated packets along multiple paths. One technique for performing this multiple path packet transport operation is described in U.S. Pat. Nos. 6,665,726 and 6,751,673, assigned to Akamai Technologies, Inc. As illustrated at step 5, several intermediate servers receive the encapsulated packets and forward them (either directly, or through other Intermediate Regions, not shown) to the gateway region 404, once again, preferably based on routes provided from the CDN mapping system. At step 6, the packets are received by a server in the gateway region 404, where duplicates are removed. Destination NAT translates the virtual IP to the target address and source Network Address Port Translation is applied to the packet before it is sent, so that the return traffic will also be sent over the overlay network. Preferably, information is stored so that return traffic is sent to the edge region 406 from which the client packet originated. At step 7, the gateway region 404 receives an IP packet from the target address and de-NATs the packet. The packet is then encapsulated. At step 8, multiple copies of the packet are sent along multiple paths. At step 9, the intermediate servers send the packets back to the original edge region for this session. At step 10, the packets are received by an edge server and duplicates are removed. The packet is sourced from the virtual IP address and then sent back to the edge region.

The various connections used in the overlay network and as described typically are secured via SSL or other transport layer security (TLS) techniques.

In the following discussion, familiarity with TURN ("Traversal Using Relay NAT," as specified in Internet Request for Comment 5766) is presumed. The reader is also presumed to be familiar with the STUN protocol, as described in RFC 3489.

With the above as background, the accelerated relay service of this disclosure is now described.

Figure 5:
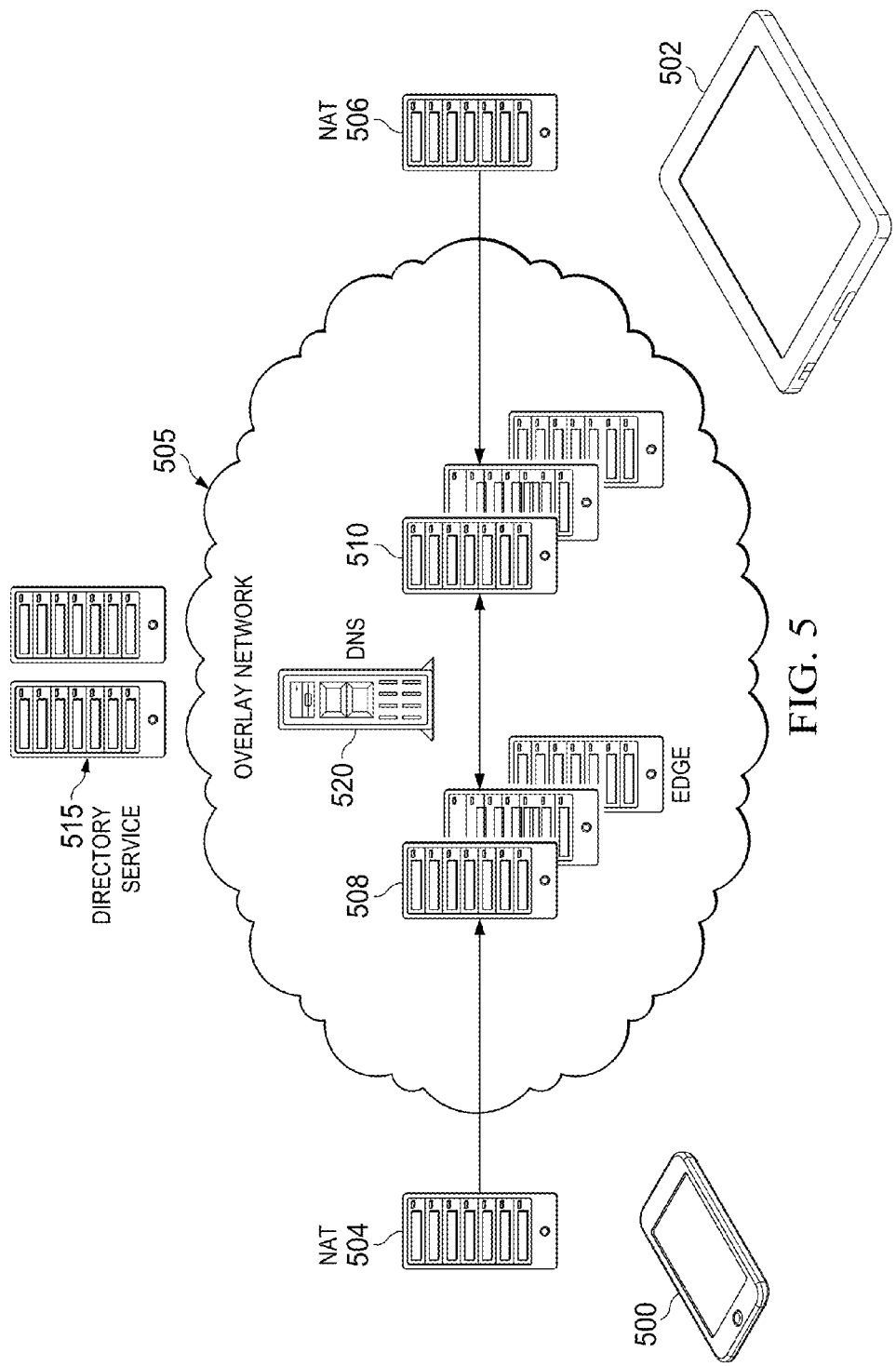
FIG. 5 illustrates a relay service according to this disclosure.

As seen in FIG. 5, peers 500 and 502 each execute an application (e.g., a video calling application). It is desired to enable peers to communicate with one another, preferably using a relay service established by the overlay network service provider. The overlay network 505 comprises sets of servers, such as edge region 508, and edge region 510. Each region typically comprises multiple edge servers, each of which is a machine such as has been described above. An edge region may comprise a single relay server. A directory service 515, which may be part of the overlay network or a service associated with a third party, is used to facilitate communications between the peers despite each being "behind" a NAT device, such as NAT device 504 and NAT device 506. Peer 500 is sometimes referred to as "Host A" and peer 502 is sometimes referred to as "Host B." NAT 504 is sometimes referred to as "NAT A" and NAT 506 is sometimes referred to as "NAT B." An overlay network relay server in edge region 508 is sometimes referred to as "Relay A" and an overlay network relay server in edge region 510 is sometimes referred to as "Relay B."

Figure 6A:
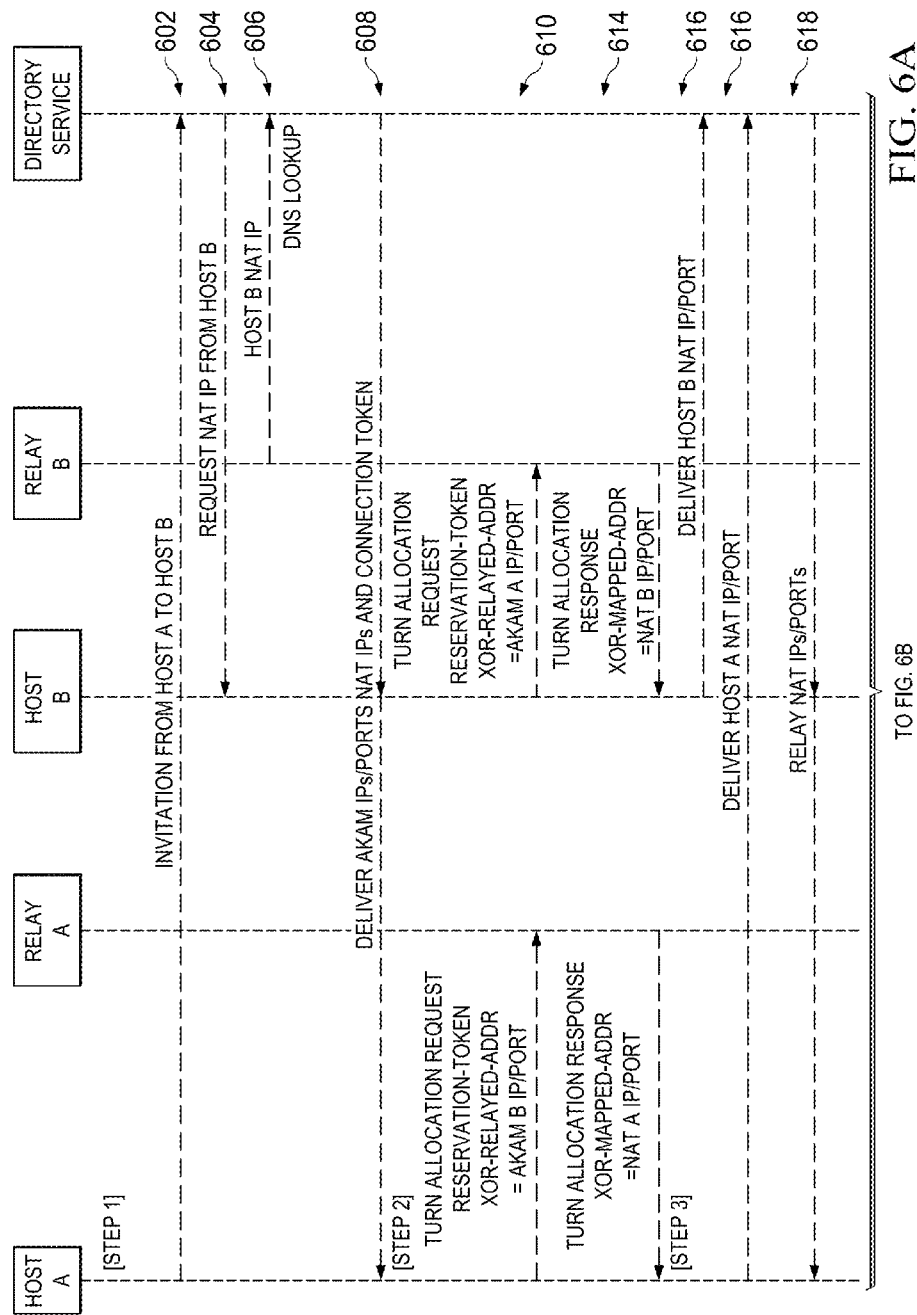

Preferably, and with reference to UML diagram in FIG. 6, connection initiation occurs as follows.

The first step (identified as [Step 1] in the drawing) involves each of the hosts contacting the directory service to obtain overlay relay server addresses. At 602, and to establish a session with Host B, Host A contacts directory service 515; in so doing, host A sends its expected NAT IP and a service port that it will use to connect to the relay server. Likewise, at 604, the directory service obtains from host B the IP address of NAT B and the anticipated relay server port. At 606, the directory server performs a hostname lookup against the overlay network DNS 520. This step is described in more detail below. The hostname lookup is used to obtain IP addresses for good regions for the relay servers (and thus the IP addresses for hosts A and B). At 608, the directory service sends all addresses and ports to Host A and Host B. After this exchange, both hosts know NAT A IP address, NAT B IP address, relay server A IP/port, and relay server B IP/port. In addition, the directory service generates and provides (at step 608) each host with a unique token that represents the connection.

The connection setup then continues with a second step (identified as [Step 2]) by which TURN sessions are then established between each host and the overlay network relay server to which it has been associated (by the directory service). As is known in the art, standard TURN expects a XOR-RELAYED-ADDRESS that is identical for all remote peers, so the attribute is included as part of an allocation request. In this embodiment, the XOR-RELAYED-ADDRESS is exchanged as part of the initial allocation, because it eases both connection identification and connection authentication. A preferred operation is as follows. At 610, hosts A and B each prepare a TURN allocation request to send to the overlay network. This request includes two standard TURN attributes, namely: XOR-RELAYED-ADDRESS=overlay network relay server IP/Port used by the other host, and RESERVATION-TOKEN=the unique ID generated by the directory service and provided to each host at 608. Preferably, TURN allocation requests also use STUN digest authentication to prepare a MESSAGE-INTEGRITY attribute. When the allocation request is received by the overlay, the relay server that receives the request performs necessary verifications, initializes necessary state, and accepts the allocation. In particular, the relay server must verify the XOR-RELAYED-ADDRESS value to ensure that the IP address could have been handed out by overlay network DNS 520 for the customer configuration in question and that the port is one the customer's configuration uses for TURN. At 614, each relay server responds with an allocation accept that includes an XOR-MAPPED-ADDRESS attribute with the NAT IP/port that were reserved for the client.

The connection method then continues with the overlay network notifying the directory service 515 with the NAT address and port. In particular, this step (identified as [Step 3]) goes back to the directory service to propagate the NAT port numbers (the only additional bit of information that was discovered in Step 2. Technically, the NAT port is not required, because the connection token could be used for connection identification. It is preferred, however, because it provides a synchronization point, ensuring that both clients have set up their TURN allocations before either attempts end-to-end communication. In addition, providing the directory service with the NAT address and port information allows both relay servers to verify all elements of the connection, including the NAT ports, before allowing data to be relayed. This approach also provides better support for multi-homed networks. The notifying step preferably works as follows. Following 614, the host has almost all required information for the connection, namely: the host's own IP address/port, address/port of its associated NAT, both relay server addresses, and a unique token representing the connection. Both hosts still need to know the other host's NAT port, and they will need to be updated on the other host's NAT IP if it has changed. To this end, at 616, each host sends its NAT address and port to the directory service 515. Note that the address from the second operation above might have changed if the host's network is multi-homed and the relay server IP address selected for the host uses a different outgoing IP than expected. At 618, the directory service 515 relays the necessary NAT IP/port information to the other host.

A final step (identified as [Step 4]) is then executed to create TURN permission/channel for remote peer. At 620, each host sends a CreatePermission request or a ChannelBind to its associated overlay network (relay) server. This request contains an XOR-PEER-ADDRESS field to identify the other peer. At 622, the hosts send data to the relay server using either TURN Send indication packets or TURN channel headers. After the remaining TURN protocol operations are complete, the relays A and B operate to forward data received from their respective peers. Thus, at 624, data from host A is received at relay A, relayed from relay A to relay B, and then forwarded from relay B to host B. At 626, data from host B is received at relay B, relayed from relay B to relay A, and then forward from relay A to host A. Thus, hosts A and B are now in peer-to-peer communication via the relay service.

Thus, in the described embodiment, each client (a peer) has a connection to a directory service. The directory service performs DNS lookups to determine which overlay network relay server (a virtual IP, or VIP) to which each of the clients should connect. The directory service then tells each client the VIP it should use and the VIP the other machine will use. The directory service also assigns a unique connection ID for the end-to-end connection. Each client then sends a session allocation request to the assigned overlay relay server. The allocation request includes the connection ID and the remote peer's relay server VIP. The overlay relay server responds with the NAT IP/port that was provisioned for the connection. The information is relayed to the remote peer via the directory service. Each client then sends a channel binding request to its assigned overlay relay server, indicating the NAT IP/port of the remote peer. At this point, each overlay relay server is aware of all necessary identifying information for the connection, namely: connection ID, each client's NAT IP/port, and each client's relay server VIP (and service port, if it is necessary for the port to be different).

After the connection is established, it may be maintained using TURN refresh requests and channel bind requests as needed. The connection may be shut down using a TURN refresh request and response.

Certain NAT devices (such as deep inspection firewalls) may terminate the SSL sessions to inspect the data being transmitted via SSL. In such case, overlay-based relay connections might not be able to bypass such a firewall unless the data being transmitted in the SSL stream looks like a valid HTTP exchange. To address this possibility, the protocol described herein may be extended to allow session establishment and data relay using pseudo-SSL session negotiation and tunneling. In this approach, TURN messages preferably are encapsulated in SSL application data protocol headers. If the relay server can verify the received SSL message, the connection can proceed; if not, however, the relay server resets the connection accordingly.

As has been described, the relay service communication between a host and its overlay network relay server functions at the application layer using a modified version of the TURN protocol. Preferably, this is the case for both connection control messages and data being relayed to the remote peer. Typically, TURN protocol messages are transported between the host and its overlay network relay within UDP datagrams, but under some circumstances they can also be transported as a TCP stream or encapsulated within pseudo-SSL records. Because the application-layer protocols used by the described technique preferably are modifications of standard protocols, typically the peer will include client software that can be used to relay data via the relay service.

As can be seen, the relay servers provide the following necessary elements for establishing and maintaining end-to-end connectivity:
  NAT mapping: When host A connects to relay server A, a NAT mapping is established at NAT A that is maintained as long as host A continues to communicate with relay server A. The same is true of host B/relay server B/NAT B.
  NAT address discovery: Each relay server "knows" the mapped NAT address and port for its host. This information is sent back to the hosts, which exchange the details via the directory service.
  Connection authentication: Through the use of secrets that are shared (for example) between the directory service and the overlay network, the authenticity of all data required for connection establishment can be verified.
  Firewall traversal: If a firewall would prevent the peers from communicating directly via UDP, the peers can communicate with the relay servers using TCP without incurring the penalty for using TCP end-to-end. In cases where TCP is unsuitable as the transport, e.g. when a caching proxy is in use on the host's network, it is also possible to transport the TURN messages encapsulated within a pseudo-SSL record stream.

As described, the accelerated relay service requires both peers to use the modified TURN protocol. In addition, typically both peers will be required to use the same transport protocol (TCP or UDP), although if both peers are using TCP as the transport, it is possible for one peer to use pseudo-SSL encapsulation and the other peer to use TCP. The accelerated relay service also requires a separate peer-to-relay connection for each peer-to-peer connection. If additional peers are to be included in the communication, a full-mesh of connections between each pair of peers in the group is required.

Preferably, the accelerated relay service selects a "best" (or optimal) relay server for the client to connect to, which means that the relay server cannot be selected until both NAT IP addresses are known. As a result, the service may rely upon the directory service infrastructure to determine the expected NAT IP. As used herein, the term "best" may be a relative term in that an optimal relay server may be optimal at a particular time or under a particular circumstance, or based on some other criteria such as cost, latency or some combination thereof.

As described above, Step 1 in the process involves the directory service (as opposed to the clients themselves) performing DNS lookups for the peers. Preferably, the overlay network authoritative DNS includes an edge mapping mechanism that comprises various data collection and processing machines, load balancing algorithms and the like. Such mapping techniques are well-known in the prior art, such as described in U.S. Pat. No. 7,716,367, in U.S. Pat. No. 7,996,531, and in others. The edge mapping mechanism includes or is associated with overlay network distributed name server processes, databases, and the like. A database typically includes hostname-to-IP address mappings or, more generally, a "map." In one approach, a first step for edge mapping is to communicate the client address pair to the overlay network DNS by using a unique overlay hostname. Generally, the edge mapping mechanism determines a good pairing of edge regions for the end-to-end connection by first determining a candidate set of edge regions for each client. This determination may take into account information such as path quality between the client and the edge region, current edge region load, and the like. Using these two region sets, the edge mapping mechanism then determines the full end-to-end path quality, preferably including any middle-mile, for each unique pair of regions, and then it selects the region pair that will provide the best (relatively-speaking) end-to-end connectivity. While such "full path" mapping is preferred, it is not required. The algorithm for evaluation of the region pairs may take into account information such as path quality, load on the middle regions, and so forth. Preferably, if a same region appears in both sets it is selected to reduce load, although this setting is configurable based on the load conditions within that region. Once the regions are identified, the individual relay servers therein (in other words, relay server A, and relay server B) are determined, preferably using known in-region load balancing techniques such as described in U.S. Pat. No. 6,108,703, simple round-robin, or the like.

Although not required, typically a peer has or can establish a persistent connection between it and the directory service.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

Having described our invention, what we claim is as follows:

1. A computer system to enable first and second mobile device peers to communicate with one another, at least one mobile device peer being associated with a respective Network Address Translation (NAT) device, comprising;

a first relay server computer at a first Internet Protocol (IP) address (a) to receive from a first peer a first session allocation request, the first session allocation request including a second IP address, and a unique connection identifier (ID) for an end-to-end connection to be established between the first and second mobile device peers, and (b) when the first session allocation request received from the first peer is accepted, to return IP address data of the respective NAT device associated with the first peer;

a second relay server computer at the second IP address (a) to receive from the second peer a second session allocation request, the second session allocation request including the first IP address, and the unique connection ID, and (b) when the second session allocation request received from the second peer is accepted, to return IP address data of the respective NAT device associated with the second peer;

the first relay server computer further operative (c) to receive from the first peer a first connection request that includes the IP address of the NAT device associated with the second peer; and the second relay server computer further operative (c) to receive from the second peer a second connection request that includes the IP address of the NAT device associated with the first peer;

the first and second relay server computers responsive to receipt of the first and second connection requests to complete the end-to-end connection between the first and second mobile devices.

2. The computer system as described in claim 1 wherein each session allocation request is a Traversal Using Relays around NAT (TURN) allocation request.

3. The computer system as described in claim 2 wherein each connection request is a TURN connection request.

4. The computer system as described in claim 3, wherein the TURN connection request is one of: a create permission request, and a channel bind request.

5. The computer system as described in claim 1 further including a directory service computer to receive name server requests from the first and second mobile device peers and, in response, to return to the respective first and second mobile device peers respective first and second data, the data comprising Internet Protocol (IP) address data, together with the unique connection identifier (ID).

6. The computer system as described in claim 1 wherein the first and second relay computer servers are further operative to maintain the end-to-end connection by processing received TURN refresh requests.

7. The computer system as described in claim 1 wherein the first and second relay computer servers are further operative to maintain the end-to-end connection by processing received TURN channel bind requests.

8. The computer system as described in claim 1 wherein first and second relay computer servers are further operative to selectively shut-down the end-to-end connection.

9. The computer system as described in claim 1 wherein the first and second relay computer servers are further operative using pseudo-Secure Sockets Layer (SSL) session negotiation and tunneling.

10. The computer system as described in claim 9 wherein the pseudo-SSL session negotiation and tunneling includes encapsulating Traversal Using Relays Around NAT (TURN) messages in SSL application data protocol headers.

* * * * *